United States Patent
Hwang et al.

(12)

(10) Patent No.: US 8,902,536 B1
(45) Date of Patent: Dec. 2, 2014

(54) SKEW-TOLERANT READER CONFIGURATIONS USING CROSS-TRACK PROFILES FOR ARRAY-READER BASED MAGNETIC RECORDING

(71) Applicant: LSI Corporation, San Jose, CA (US)

(72) Inventors: Eui Seok Hwang, Palo Alto, CA (US); George Mathew, San Jose, CA (US)

(73) Assignee: LSI Corporation, San Jose, CA (US)

( * ) Notice: Subject to any disclaimer, the term of this patent is extended or adjusted under 35 U.S.C. 154(b) by 0 days.

(21) Appl. No.: 14/252,652

(22) Filed: Apr. 14, 2014

Related U.S. Application Data

(60) Provisional application No. 61/973,806, filed on Apr. 1, 2014.

(51) Int. Cl.
*G11B 21/02* (2006.01)

(52) U.S. Cl.
USPC .......................................... 360/75; 360/77.06

(58) Field of Classification Search
None
See application file for complete search history.

(56) References Cited

U.S. PATENT DOCUMENTS

| | | | | |
|---|---|---|---|---|
| 6,157,510 | A * | 12/2000 | Schreck et al. | 360/77.06 |
| 6,266,205 | B1 * | 7/2001 | Schreck et al. | 360/77.06 |
| 2006/0250718 | A1 * | 11/2006 | Nakamura et al. | 360/1 |
| 2009/0310249 | A1 * | 12/2009 | Michinaga | 360/77.02 |

OTHER PUBLICATIONS

George Mathew et al., "Capacity Advantage of Array-Reader Based Magnetic Recording for Next Generation Hard Disk Drives," Digests of the 24th Magnetic Recording Conference TMRC 2013, Aug. 20-22, 2013, pp. i-ii, 1, and 58-59.

Nuno Miguel De Figueiredo Garrido, "Available Techniques for Magnetic Hard Disk Drive Read Channel Equalization," NM de Figueiredo Garrido, Jul. 8, 2013, pp. 1-13.

Chan Kheong Sann, "Channel Models and Detectors for Two-Dimensional Magnetic Recording (TDMR)," IEEE Trans. Magn., vol. 46, No. 3, pp. 804-811, 2010.

\* cited by examiner

*Primary Examiner* — Paul Huber
(74) *Attorney, Agent, or Firm* — Hamilton DeSanctis & Cha

(57) ABSTRACT

A method for enhancing read performance in an ARMR system includes: obtaining a first reader offset profile corresponding to a first reader of a multi-reader array head in the ARMR system; obtaining at least a second reader offset profile corresponding to at least a second reader of the multi-reader array head in the ARMR system; combining the first and second reader offset profiles to generate a combined reader offset profile; and controlling a location of the multi-reader array head in the ARMR system relative to at least one target track associated with a magnetic storage medium to be read as a function of a peak amplitude of the combined reader offset profile.

23 Claims, 11 Drawing Sheets

SKEW-TOLERANT READER CONFIGURATIONS USING CROSS-TRACK PROFILES FOR ARRAY-READER BASED MAGNETIC RECORDING

CROSS-REFERENCE TO RELATED APPLICATIONS

This application claims priority to U.S. Provisional Application No. 61/973,806 filed on Apr. 1, 2014, the complete disclosure of which is incorporated herein by reference in its entirety.

FIELD OF INVENTION

The present invention relates generally to electrical and electronic circuitry, and more particularly relates to magnetic recording.

BACKGROUND

The magnetic disk drive recording industry continues to pursue advances in technology that will sustain enhancements in recording density in a cost-effective manner. Two approaches currently under investigation are bit patterned media recording (BPMR) and heat-assisted magnetic recording (HAMR). An objective of these approaches is to overcome challenges posed by the super-paramagnetic limit that imposes a trade-off among three fundamentally competing recording parameters: media signal-to-noise ratio (SNR), writability and thermal stability. BPMR and HAMR, however, require modifications to the media and heads which significantly increase costs. Another technology, two-dimensional magnetic recording (TDMR), which uses conventional media and a new multiple-head configuration, relies on powerful signal processing in an attempt to achieve a theoretical one bit-per-grain recording density.

As a practical near-term milestone, array-reader based magnetic recording (ARMR) has been proposed to increase areal density with an array-reader and associated signal processing.

SUMMARY

In accordance with an embodiment of the invention, a method for enhancing read performance in an ARMR system includes: obtaining a first reader offset profile corresponding to a first reader of a multi-reader array head in the ARMR system; obtaining a second reader offset profile corresponding to a second reader of the multi-reader array head in the ARMR system; combining the first and second reader offset profiles to generate a combined reader offset profile; and controlling a location of the multi-reader array head in the ARMR system relative to at least one target track associated with a magnetic storage medium to be read as a function of a peak amplitude of the combined reader offset profile. Other embodiments of the invention include but are not limited to being manifest as an ARMR read circuit fabricated as part of an integrated circuit and an electronic system. Additional and/or other embodiments of the invention are described in the following written description, including the claims, which is to be read in connection with the accompanying drawings.

BRIEF DESCRIPTION OF THE DRAWINGS

The following drawings are presented by way of example only and without limitation, wherein like reference numerals (when used) indicate corresponding elements throughout the several views, and wherein.

It is to be appreciated that the drawings described herein are presented for illustrative purposes only. Moreover, common but well-understood elements and/or features that may be useful or necessary in a commercially feasible embodiment may not be shown in order to facilitate a less hindered view of the illustrated embodiments.

WRITTEN DESCRIPTION

Embodiments of the invention will be described herein in the context of illustrative array-reader based magnetic recording (ARMR) systems for use, for example, in a data storage application. It should be understood, however, that embodiments of the invention are not limited to these or any other particular ARMR arrangements. Rather, embodiments of the invention are more broadly applicable to techniques for improving read performance of a magnetic storage device. In this regard, embodiments of the invention provide an apparatus and methodology for beneficially mitigating the impact of skew in an ARMR system by applying cross-track profiles from multiple readers and locating the reader assembly based on the respective cross-track profiles of the readers to thereby improve skew tolerance while reading with an array reader. More particularly, one or more embodiments of the invention involve determining a position of readers in a multiple-reader ARMR system based, at least in part, on predicted cross-track separation (CTS) of the readers of a multi-reader head from an estimated zero-skew CTS, noted as $CTS_0$, a zero-skew down-track separation (DTS), noted as $DTS_0$, and skew angle (or zone). Moreover, it will become apparent to those skilled in the art given the teachings herein that numerous modifications can be made to the illustrative embodiments shown that are within the scope of the claimed invention. That is, no limitations with respect to the embodiments shown and described herein are intended or should be inferred.

As a preliminary matter, for purposes of clarifying and describing embodiments of the invention, the following table provides a summary of certain acronyms and their corresponding definitions, as the terms are used herein:

Table of Acronym Definitions

| Acronym | Definition |
| --- | --- |
| BPMR | Bit patterned media recording |
| HAMR | Heat-assisted magnetic recording |
| SNR | Signal-to-noise ratio |
| TDMR | Two-dimensional magnetic recording |
| VCM | Voice coil motor |
| CPU | Central processing unit |
| SSD | Solid-state drive |
| RAM | Random access memory |
| ARMR | Array-reader based magnetic recording |
| PMR | Perpendicular magnetic recording |
| TP | Track pitch |
| AFE | Analog front end |
| CTS | Cross-track separation |
| DTS | Down-track separation |
| ITI | Inter-track interference |
| MISO | Multiple-input single-output |
| MIMO | Multiple-input multiple-output |
| OTER | On-track error rate |
| OTC | Off-track capability |
| MD | Mid-diameter |
| BER | Bit error rate |

Figure 1:
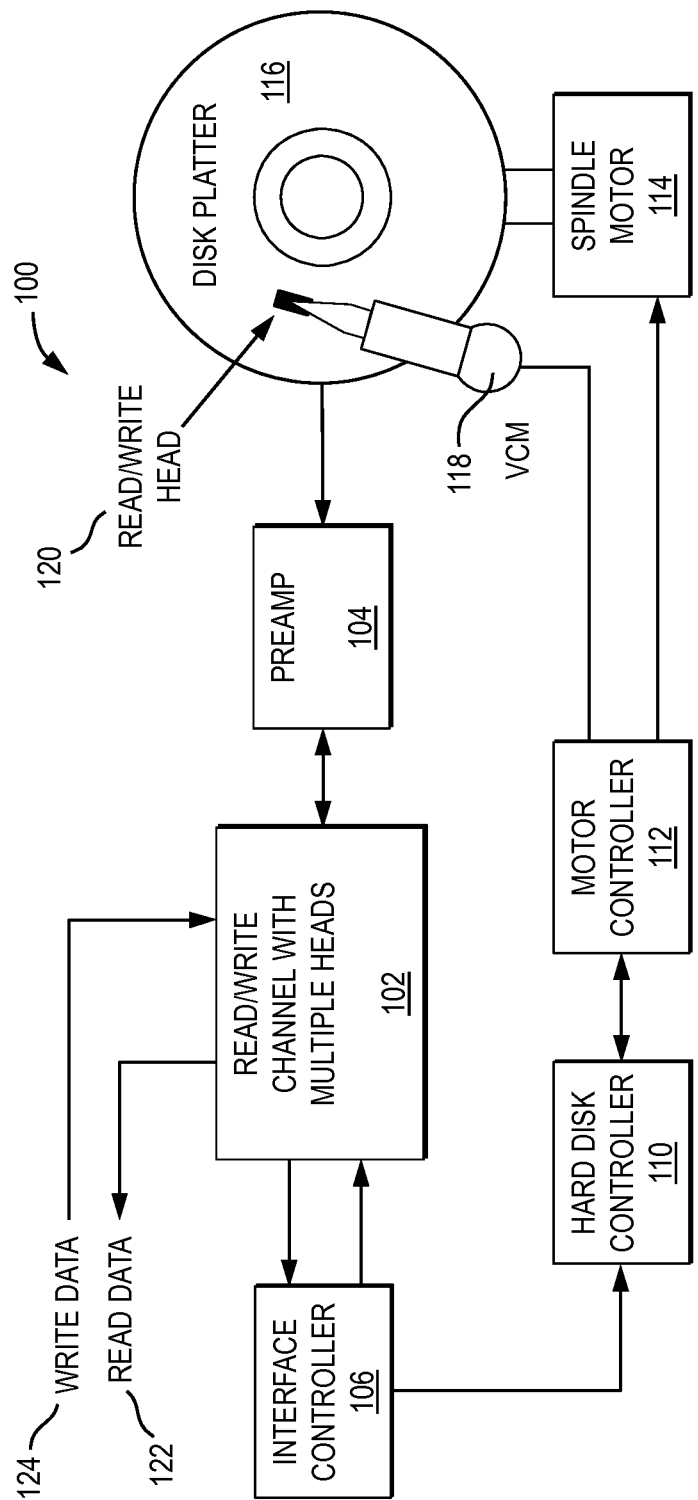
FIG. 1 is a block diagram depicting at least a portion of a magnetic disk drive storage system in which one or more embodiments of the invention are employed.

FIG. 1 is a block diagram depicting at least a portion of a magnetic disk drive storage system 100 in which one or more embodiments of the invention are employed. The system 100 includes a read/write channel 102 with multiple heads, a preamplifier (preamp) 104 coupled with the read/write channel, an interface controller 106 coupled with the read/write channel, a hard disk controller 110 coupled with the interface controller, a motor controller 112 coupled with the hard disk controller, and a spindle motor 114 coupled with and operative to rotate a disk platter 116 comprising a plurality of tracks, or an alternative magnetic storage medium. A voice coil motor (VCM) 118 attached to an actuator arm is configured to maintain a position of at least one read/write head 120 above a surface of the disk platter 116 as a function of one or more control signals generated by the motor controller 112. In a multi-reader configuration, the system 100 would include multiple read/write heads and corresponding preamplifiers coupled therewith. Thus, read/write head 120 is intended to collectively represent one or a plurality of read/write heads; likewise, preamplifier 104 is intended to collectively represent one or a plurality of preamplifiers coupled with corresponding read/write heads.

The read/write channel 102 is the fundamental mixed signal analog/digital module of the disk drive storage system 100 and, although shown as a single block, is actually comprised of two separate channels: a read channel and a write channel. The read channel is operative to extract, from the disk platter 116, a clock signal, equalize an input read head signal (i.e., read pulse), make a determination regarding a digital state (e.g., logic "1" or "0") of the input read head signal, and decode read data 122 as a function of the input read head signal. The write channel is operative to encode write data 124 for storage on the disk platter 116 in the form of magnetic field orientations indicative of a logical state of the write data. The read/write channel 102 is assisted by the preamplifier 104, which is configured to drive the write head portion of the read/write head 120 during a write process and to amplify the input signal obtained from the read head portion of the read/write head during a read process.

The interface controller 106 is adapted to control a data interface between the read/write channel 102 and a central processing unit (CPU) or alternative controller, which may include handling interrupts and data transfer protocols common to magnetic drives or solid-state drives (SSDs). The interface controller 106 may optionally include an auxiliary buffer, which can be implemented, for example, using random access memory (RAM), for caching and queuing data, providing long data-bursts to improve speed and reduce bus latency. The hard disk controller 110 calculates actuator trajectories and controls the spindle motor 114 and VCM 118, via the motor controller 112, to correctly position and maintain the read/write head 120 on a prescribed track of the disk platter 116.

As previously stated, one disadvantage with bit patterned media recording (BPMR) and heat-assisted magnetic recording (HAMR) is that these approaches, while providing improved recording density, require substantial modifications to the media and heads which significantly increases overall cost. ARMR is seen as an intermediate approach between current perpendicular magnetic recording (PMR) and two-dimensional magnetic recording (TDMR) which provides a significant increase in storage density compared to PMR while avoiding the challenges posed by BPMR and HAMR. ARMR uses standard media and an array of read heads, also referred to herein as an array reader, in conjunction with modest changes in read-back signal processing to achieve improved signal-to-noise ratio (SNR) of a track that is being read, rather than sensing data from multiple tracks.

ARMR achieves an areal density gain by employing multi-dimensional joint signal processing of multiple read-back signals from the array reader. Embodiments of the invention are shown and described herein in the context of an array reader including two readers which are positioned according to a prescribed cross-track separation (CTS) and down-track separation (DTS). Due to skew, among other factors (e.g., temperature, vibration, etc.), the effective reader separations will vary; the larger the CTS and DTS between readers, the larger the CTS will vary with skew. While embodiments of the invention are described herein in the context of an array reader including two readers, it is to be appreciated that embodiments of the invention are not limited to any specific number of readers.

TDMR is a recording architecture intended to support storage densities beyond those of conventional recording systems. TDMR utilizes multiple readers to read from multiple adjacent tracks and uses joint signal processing and detection to decode the signal from a target track. The gains achieved from TDMR come primarily from more powerful coding and signal processing algorithms which allow data bits to be stored more densely on a magnetic storage medium (e.g., disk). In a traditional disk architecture with a single read head, reading a single sector with TDMR generally involves reading the sectors at multiple read-offsets, requiring additional disk rotations. To circumvent this problem, TDMR disks may use multiple read heads, also referred to as readers, on the same support arm, typically referred to as a slider, thus restoring traditional read service times. One disadvantage of using a multi-reader approach is that there is an inherent offset (i.e., delay) between respective signals obtained from the read heads due, at least in part, to the physical distance separating the read heads. Although manufacturers may provide information regarding the physical distances between the multiple read heads, actual offset between the read heads and a track-center, referred to herein as reader offset, can vary based on several factors. Such factors which may affect reader offset include, but are not limited to, environmental factors, such as, for example, temperature and mechanical vibration, as well as manufacturing factors, such as, for example, skew between the slider and the disk surface, and alignment of the read heads relative to one another and/or to the slider, among other factors. Individual reader locations are typically fixed in the reader assembly (e.g., integrated to the slider) by the manufacturer. In accordance with one or more embodiments, the reader assembly is moved to access a track of interest, and relative reader positions are determined by the skew angle and zero-skew DTS and CTS.

The performance of a system utilizing ARMR will be dependent upon the respective locations of the readers relative to a center of a target track to be read. In a two-reader arrangement, for smaller separation (e.g., CTS about 0.2 track pitch (TP)), placing both readers at off-track locations with a reader assembly at an on-track location provides suitable performance, while for larger separation (e.g., CTS about 0.6 TP), placing the reader assembly at an on-track location may show poor performance since both readers are far from the center of the target track (e.g., 0.3 TP off-track). Thus, for larger separation and/or higher skew conditions, placing one of the readers at an on-track location and placing the reader assembly at an off-track location can achieve improved performance. Consequently, one or more embodiments of the invention provide a skew-tolerant reader assembly arrangement in which a prescribed off-track location for the reader assembly is pre-computed and saved based at least in part on prescribed reader geometry and skew, and which is operative to apply reader offsets while reading data from that zone of skew condition.

Figure 2:
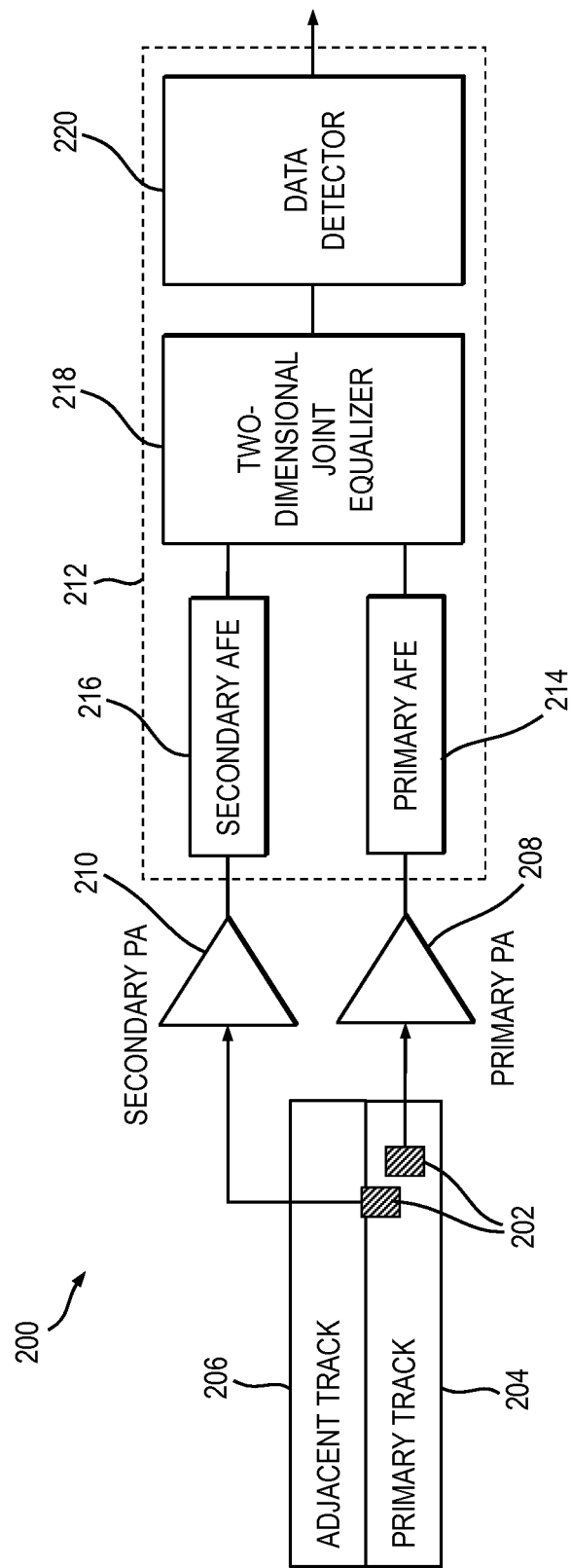
FIG. 2 is a block diagram depicting at least a portion of read-back signal processing blocks for an exemplary two-reader system.

FIG. 2 is a block diagram depicting at least a portion of read-back signal processing blocks for an exemplary two-reader system 200. The system 200 includes two readers 202 positioned to read data on corresponding tracks, or portions of a track, of a magnetic recording medium; particularly, a primary track 204 and an adjacent track 206 proximate to the primary track. The respective read signals obtained from the readers 202 are supplied to corresponding primary preamplifier (PA) 208 and secondary preamplifier 210. Amplified read signals generated by the preamplifiers 208, 210 are supplied to a read channel module 212 for further processing. Specifically, a primary analog front end (AFE) 214 is adapted to receive the amplified read signal generated by the primary preamplifier 208, and a secondary AFE 216 is adapted to receive the amplified read signal generated by the secondary preamplifier 210. The AFEs 214, 216 are operative to convert the analog amplified read signals generated by the preamplifiers 208, 210 to corresponding digital read signals. The digital read signals are supplied to a two-dimensional joint equalizer 218 which is operative to equalize its combined output to an ideal target signal, where the target can be a partial response (PR) target, to thereby generate an equalized signal. The equalized signal generated by the two-dimensional joint equalizer 218 is supplied to a Viterbi-like data detector 220, which is operative to detect the written data stored on the magnetic storage medium from the equalized signal, to thereby generate an output signal of the two-reader system 200.

The locations of the readers in an ARMR system are characterized by their cross-track separation (CTS) and/or down-track separation (DTS) between readers. Embodiments of the invention are shown and described herein in the context of a multi-reader head including two read-elements (i.e., readers) that are positioned according to a prescribed CTS and DTS. Due to skew, among other factors (e.g., temperature, vibration, etc.), the effective CTS between readers will vary. Further, the larger the DTS between read-elements without skew, denoted by $DTS_0$ or d, the more the CTS will vary with skew. Likewise, the smaller the DTS between readers in a multi-reader head, the smaller the sensitivity to skew angle. The term "skew angle" as used herein is intended to refer broadly to an angle between a reader assembly, to which one or more readers are attached, and a tangent to a target track to be read. It is to be appreciated that while exemplary embodiments of the invention are described herein in the context of a multi-reader head including two readers, embodiments of the invention are not limited to any specific number of readers.

Figure 3A:
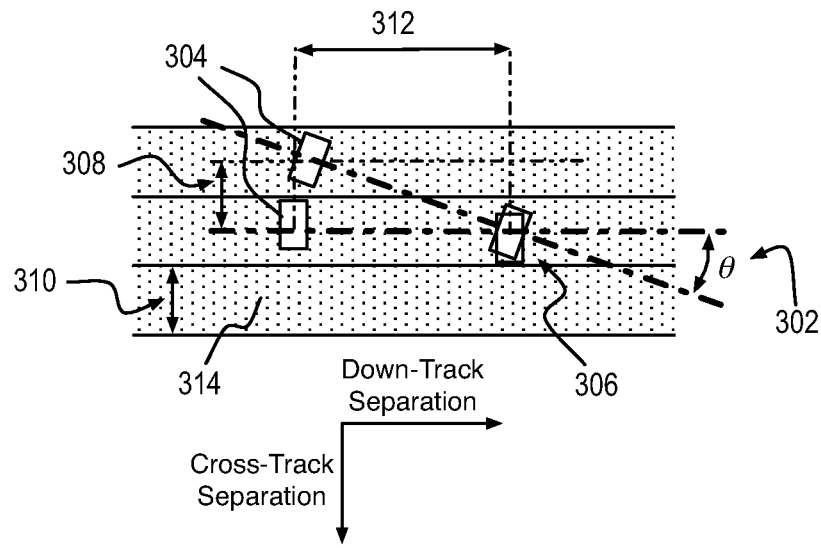
FIGS. 3A-3C are top plan views conceptually illustrating how reader cross-track separation (CTS) varies with skew angle for an exemplary multi-reader head.
Figure 3B:
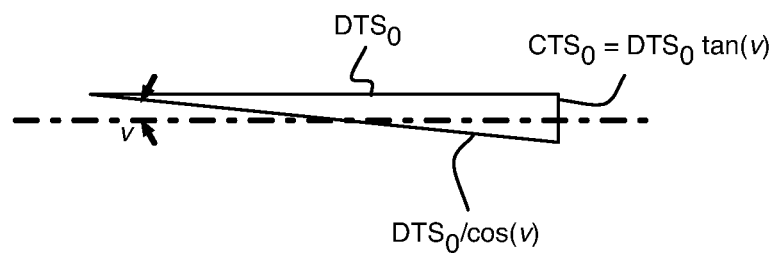
Figure 3C:
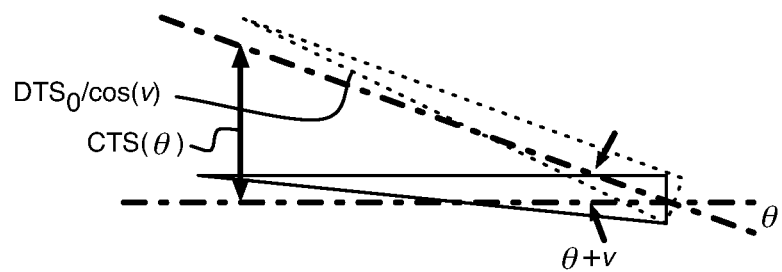

FIGS. 3A-3C are top plan views conceptually depicting how reader CTS 308 varies with skew angle 302 for an exemplary multi-reader head. In FIG. 3A, a multi-reader head is shown disposed at two different skew angles; namely, 0 and θ degrees. It follows that the difference between the two different skew angles is θ 302. The multi-reader head includes two readers, 304 and 306, shown disposed relative to one another for each of the two skew angles. A certain CTS 308 occurs between the two readers given the skew angle θ and is represented by ζ(θ), also denoted by CTS(θ). Note, that DTS 312 decreases with increasing skew angle θ. It should also be understood that, in one or more embodiments, CTS and DTS are measured in terms of track pitch (TP) 310 (three tracks, e.g., 314, are shown in FIG. 3A). For example, DTS=2TP means that the down-track separation of two readers of the multi-reader head is equal to two times the track pitch, at a particular skew angle.

FIG. 3B illustrates the CTS and DTS between two readers at 0 degree skew angle, denoted by $CTS_0$ and $DTS_0$, respectively, with v denoting an angle of separation between the readers at zero skew. It should be understood that a multi-reader head having a shorter DTS experiences smaller CTS variations for the same skew angle (e.g., CTS variation is smaller for a multi-reader head having $DTS_0=2TP$ compared to that of a multi-reader head having DTS=6TP).

With reference to FIG. 3C, a relationship describing the variation of CTS with skew angle for a given $DTS_0$ and $CTS_0$, in accordance with an illustrative embodiment, is written as:

$$CTS(\theta) = \frac{DTS_0}{\cos v \cdot \sin(\theta + v)}$$
$$= \frac{DTS_0}{\cos v (\sin(\theta)\cos(v) + \cos(\theta)\sin(v))}$$

$CTS(\theta)=DTS_0 \sin(\theta)+CTS_0 \cos(\theta) \sim CTS_0+DTS_0\theta$, for small θ.

Here, a small skew angle θ can be between, for example, about −16 degrees and +16 degrees. In another embodiment, the range of θ is between about −16 degrees and +20 degrees. Different hardware (e.g., disk platters and read-elements) can have different skew angle ranges. It is to be understood, however, that embodiments of the invention are not limited to any specific angle or range of angles.

Figure 4B:
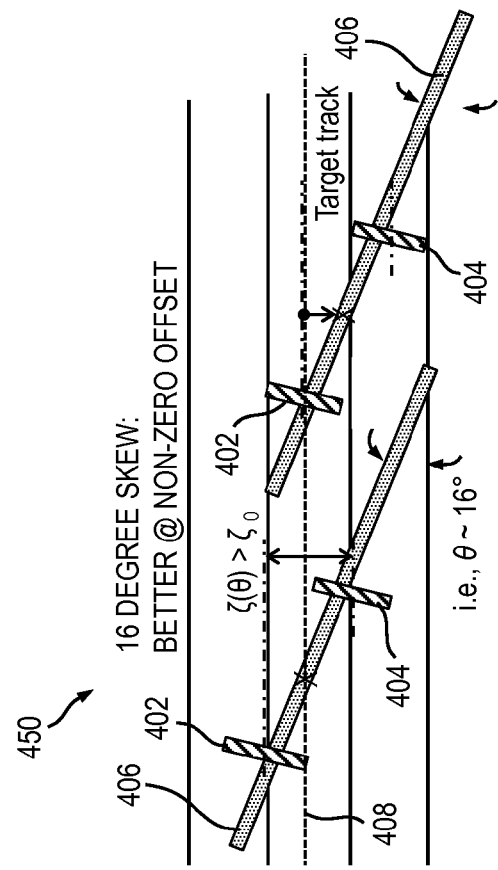
FIGS. 4A and 4B are top plan views conceptually depicting alternative reader configurations in a two-reader ARMR system.
Figure 4A:
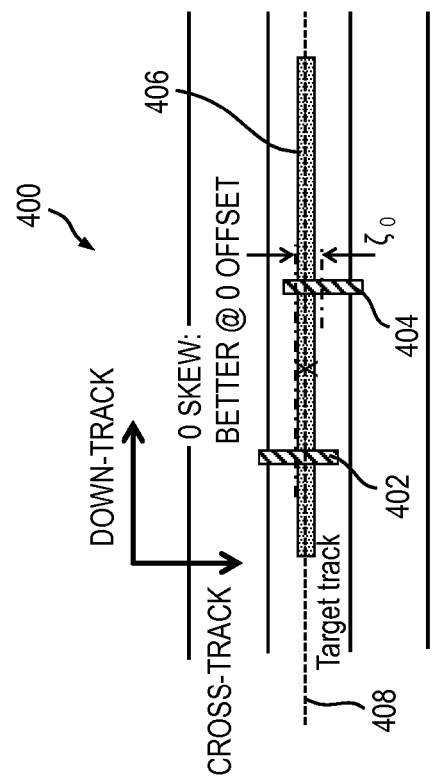

FIGS. 4A and 4B are top plan views conceptually depicting alternative reader configurations in a two-reader ARMR system. With reference to FIG. 4A, an ARMR system 400 includes a first reader 402 and a second reader 404 attached to a reader assembly 406. The reader assembly 406 is positioned at zero-degree skew angle (i.e., zero skew) over a centerline 408 of a target track. The readers 402, 404 are positioned on the reader assembly 406 such that the centers of the readers are offset relative to one another in a cross-track direction by a prescribed distance, $\zeta_0$. As shown in FIG. 4A, at zero skew, the reader assembly 406 is located over the track centerline 408, and a small CTS between the first and second readers 402, 404 ensures that both readers are positioned over the target track. Note that in this illustrative embodiment, $\zeta_0$ is non-zero, but small.

With reference now to FIG. 4B, an ARMR system 450 is configured such that the reader assembly 406 to which the readers 402 and 404 are attached has a skew angle $\theta$ of about 16 degrees relative to the centerline 408 of the target track. As apparent from FIG. 4B, when the skew angle $\theta$ is non-zero, the CTS between readers 402, 404 will increase compared to a zero-skew scenario (i.e., $\zeta(\theta) > \zeta_0$, where $\theta$ is non-zero). In a non-zero skew scenario, depending on the DTS between readers, a situation may arise in which none of the readers are aligned over the target track if a cross-track center of two readers is aligned with the centerline 408 of the target track; the larger the separation between readers in a down-track direction, the greater the likelihood that none of the readers will be aligned with the target track.

By way of illustration only and without limitation, assume that the readers 402, 404 are located as shown in the left-hand portion of FIG. 4B. In this scenario, neither of the readers will be positioned over the target track. Thus, for improved performance, the reader assembly 406 is placed at an off-track location. For the illustrative embodiment shown in the right-hand portion of FIG. 4B, a point on the reader assembly 406 (marked with an "x") between the first and second readers 402, 404 is positioned at a prescribed distance off the centerline 408 of the target track in a cross-track direction. In this configuration, the first reader 402 is positioned over the target track and the second reader 404 is positioned over an adjacent track. Although the second reader 404 will not be positioned so as to read information from the target track, the first reader 402 will be positioned so as to read information from the target track. Additionally, the signal from the adjacent track read by the second reader 404 may still be helpful in providing a more robust read signal, such as, for example, by cancelling or reducing inter-track interference (ITI).

In accordance with embodiments of the invention, a determination as to where to position the readers relative to the target track for improved performance is made based at least in part on cross-track profiles for each of the readers. In one or more embodiments, Gaussian cross-track profile models for each of the readers are used. In one or more alternative embodiments, cross-track profiles are measured, such as, for example, during a calibration procedure, to achieve more accurate adjustments of the reader variations. Pre-computed designated read offsets for each zone or for a given skew corresponding to each of at least a subset of the readers are saved, and a position of the readers is determined as a function of a summation of the cross-track profiles for a given skew or reader separation, according to one or more embodiments. Summation can also be done in power domain, where the combined profile is a square root of a summation of the square of the cross-track profiles of the readers. While reading the data with the array reader, the pre-computed designated read offsets corresponding to the zone or skew associated with the reader are applied, according to one or more embodiments.

Figure 5:
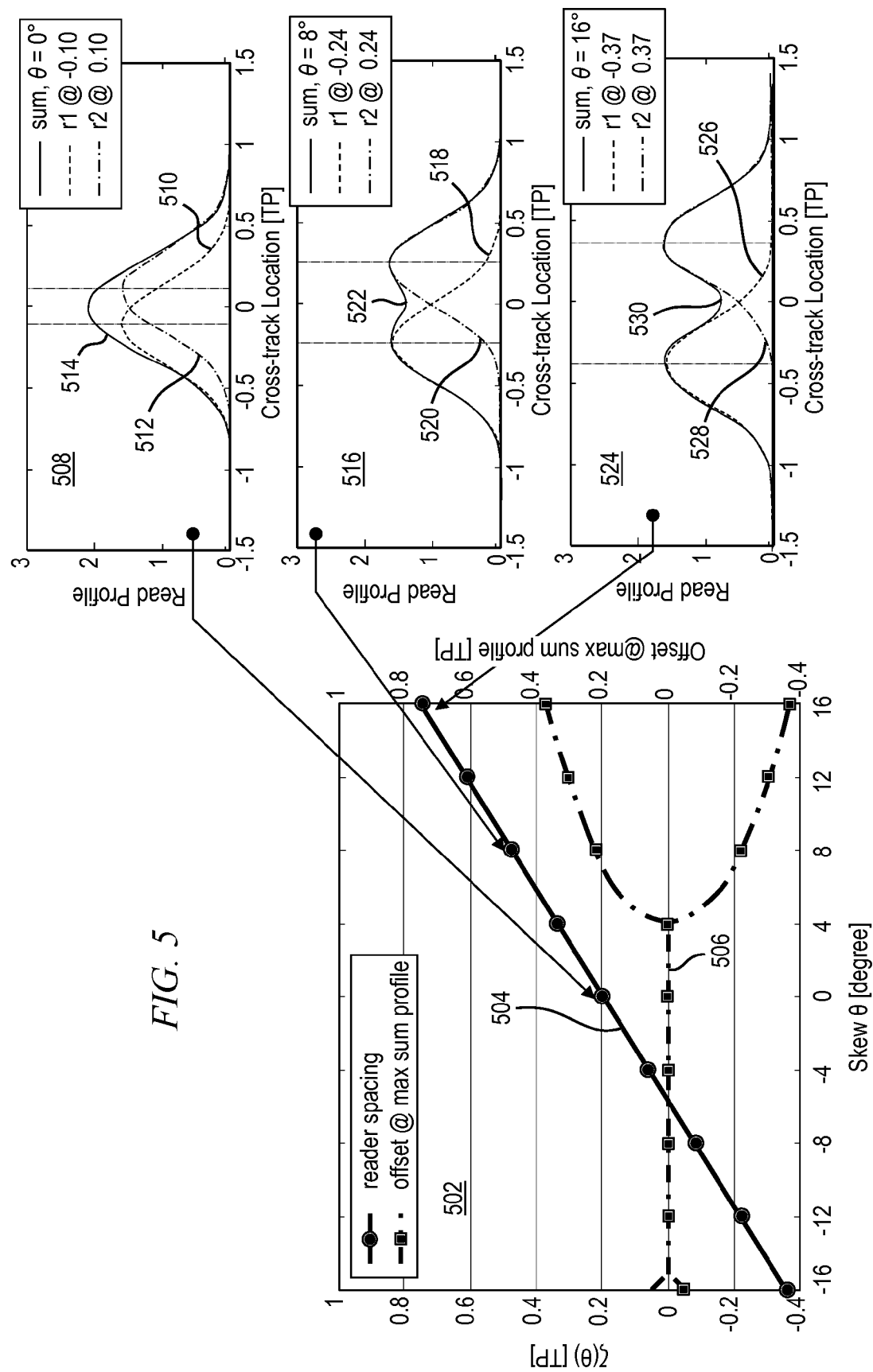
FIG. 5 conceptually depicts an exemplary methodology for locating the readers in a multiple-reader ARMR system using Gaussian profiles of the readers, according to an embodiment of the invention.

FIG. 5 conceptually depicts an exemplary methodology for locating the readers in a multiple-reader ARMR system using Gaussian profiles of the readers, according to an embodiment of the invention. In panel 502, graph 504 illustrates how reader CTS $\zeta(\theta)$ (shown on the left y-axis in units of track pitch (TP)) varies with skew angle $\theta$ (shown on the x-axis in units of degrees), and graph 506 illustrates a relationship between read offset or location of the center of the array-reader (shown on the right y-axis in units of TP) and skew angle at a maximum sum of the cross-track profiles, $\sigma_{r1}$ and $\sigma_{r2}$, for the first and second readers, respectively. The left and right y-axes are different in FIG. 5 to show two different quantities together. More particularly, graph 504 shows that at zero skew, the effective cross-track separation (i.e., CTS) between the first and second readers is about 0.2 TP. At a skew angle of about −6 degrees, the effective separation between readers is about zero; at a skew angle of 16 degrees, the effective reader separation is about 0.74 TP. As shown by graph 504, the reader separation $\zeta(\theta)$ increases substantially linearly with increasing skew angle $\theta$.

Panel 508 illustrates a cross-track profile 510 of the first reader (r1), a cross-track profile 512 of the second reader (r2), and a sum of the cross-track profiles 514 for the two readers for a skew angle of zero degrees. The sum in this example is a square root of the sum of the squared reader profiles. A peak amplitude of the cross-track profile for the first reader is about 1.6, which occurs at about −0.10 TP, and a peak amplitude of the cross-track profile for the second reader is about 1.6, which occurs at about 0.10 TP. As apparent from panel 508, a maximum amplitude of the sum of the cross-track profiles for the two readers is about 2.1 and occurs at about 0 TP for the reader assembly.

Panel 516 illustrates a cross-track profile 518 of the first reader, a cross-track profile 520 of the second reader, and a sum of the cross-track profiles 522 for the two readers for a skew angle of eight degrees. A peak amplitude of the cross-track profile for the first reader is about 1.6, which occurs at about −0.24 TP, and a peak amplitude of the cross-track profile for the second reader is about 1.6, which occurs at about 0.24 TP. As apparent from panel 516, a maximum amplitude of the sum of the cross-track profiles for the two readers does not occur at 0 TP; the amplitude of the sum profile 522 is about 1.4 at 0 TP, which is actually less than the peak amplitude of each of the individual readers. Instead, the sum of the cross-track profiles 522 exhibits two peaks, each having an amplitude of about 1.6, which occurs at about −0.2 TP and 0.2 TP for the reader assembly. It is to be appreciated that the individual reader profile can be changed with the skew angle and can be accommodated to a cross-track profile evaluation step, according to one or more embodiments of the invention.

Panel 524 illustrates a cross-track profile 526 of the first reader, a cross-track profile 528 of the second reader, and a sum of the cross-track profiles 530 for the two readers for a skew angle of sixteen degrees. A peak (i.e., maximum) amplitude of the cross-track profile for the first reader is about 1.6, which occurs at about −0.37 TP, and a peak amplitude of the cross-track profile for the second reader is about 1.6, which occurs at about 0.37 TP. As for illustrative scenario depicted in panel 516 having a skew angle of eight degrees, the peak amplitude of the sum of the cross-track profiles for the two readers having a skew angle of sixteen degrees does not occur at 0 TP; the amplitude of the sum profile 530 is about 0.7 at 0 TP, which is considerably less than the peak amplitude of each of the individual readers. Instead, the sum of the cross-track profiles 530 exhibits two peaks, each having an amplitude of about 1.6, which occurs at about −0.37 TP and 0.37 TP for the reader assembly.

For the illustrative embodiment shown in FIG. 5, with regard to placement of the reader assembly for improved read performance, graph 506 in panel 502 indicates that the reader assembly can be located essentially without any offset (i.e., 0 TP), relative to a centerline of the target track, for skew angles in a range from about −16 degrees to about 4 degrees. Once the skew angle exceeds about 4 degrees, however, the peak amplitude of a combination (e.g., sum) of the reader profiles no longer occurs at 0 TP, and therefore improved reader performance can be achieved by offsetting the reader assembly (e.g., a centerline of the cross-track distance between the readers) at a prescribed distance from the centerline of the target track. For example, with reference to graph 506, when the skew angle is 8 degrees, moving the reader assembly about ±0.2 TP down-track from the centerline of the target track will achieve improved read performance. Likewise, when the skew angle is 16 degrees, the reader assembly is preferably moved about ±0.37 TP down-track from the centerline of the target track to achieve improved read performance. For these non-zero offset scenarios, it is to be appreciated that only one of the readers will be reading information from the target track; the other reader will be positioned over and reading information from an adjacent track, which may still provide some benefit (e.g., for reducing ITI), as previously explained.

The illustrative embodiments shown in FIGS. 4A, 4B and 5 involved a multiple-input single-output (MISO) ARMR system, wherein inputs from multiple readers are used to retrieve information from a single target track. However, aspects according to other embodiments of the invention can be beneficially extended for use in a multiple-input multiple-output (MIMO) ARMR system, wherein inputs from multiple readers are used to retrieve information from more than one track, particularly for applications in which higher throughput is desired. MIMO ARMR systems are more severely impacted by skew compared to MISO ARMR systems.

Figure 6B:
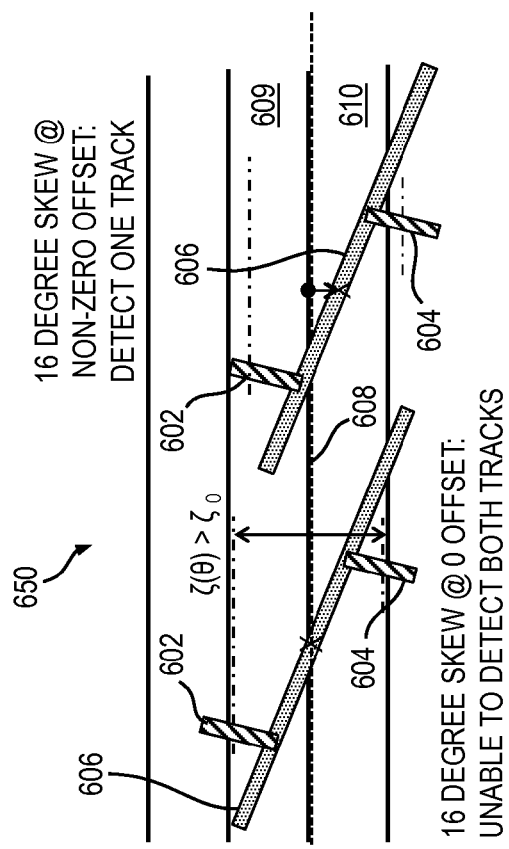
FIGS. 6A and 6B are top plan views conceptually depicting alternative reader configurations in a two-reader multiple-input multiple-output ARMR system.
Figure 6A:
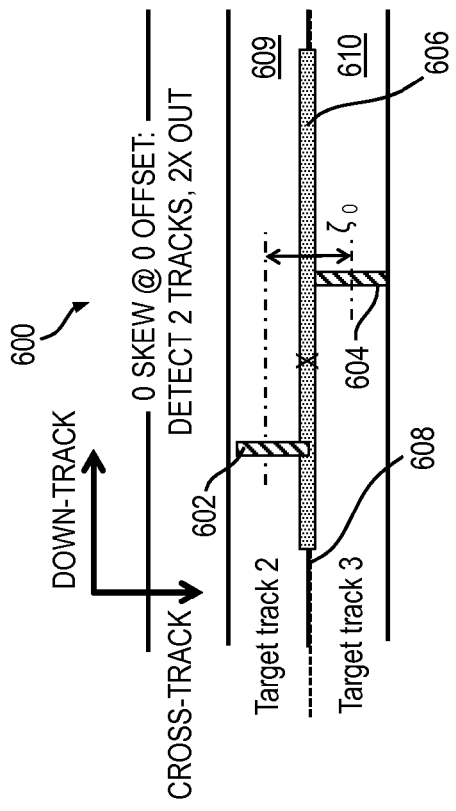

FIGS. 6A and 6B are top plan views conceptually depicting alternative reader configurations in a two-reader MIMO ARMR system. With reference to FIG. 6A, a MIMO ARMR system 600 includes a first reader 602 and a second reader 604 attached to a reader assembly 606. The reader assembly 606 is positioned at zero-degree skew angle (i.e., zero skew) over a boundary 608 between two target tracks; namely, a first target track (target track 2) 609 and a second target track (target track 3) 610. The readers 602, 604 are positioned on the reader assembly 606 such that the centers of the readers are offset relative to one another in a cross-track direction by a prescribed distance, $\zeta_0$. As shown in FIG. 6A, at zero skew, the readers 602 and 604 are configured having a CTS $\zeta_0$ which ensures that both readers are positioned over corresponding target tracks 609 and 610, respectively. In this manner, a throughput of two times (2×) the throughput of a comparable MISO ARMR system is achieved.

With reference now to FIG. 6B, a MIMO ARMR system 650 is configured such that the reader assembly 606, to which the readers 602 and 604 are attached, has a skew angle θ of about 16 degrees relative to the boundary 608 between target tracks. As apparent from FIG. 6B, when the skew angle θ is non-zero, the CTS between readers 602, 604 will increase compared to the zero-skew scenario (i.e., $\zeta(\theta) > \zeta_0$, where θ is non-zero). In a non-zero skew scenario, depending on the DTS between readers, a situation may arise in which none of the readers are aligned over their corresponding target tracks; the larger the separation between readers in a down-track direction, the greater the likelihood that none of the readers will be aligned with a corresponding target track.

By way of illustration only and without limitation, assume that the readers 602, 604 are located as shown in the left-hand portion of FIG. 6B. In this scenario, neither of the readers will be positioned over their corresponding target tracks. Thus, for improved performance, the reader assembly 606 is placed at an off-track location. For the illustrative embodiment shown in the right-hand portion of FIG. 6B, a point on the reader assembly 606 (marked with an "x") between the first and second readers 602, 604 is positioned at a prescribed distance off the boundary 608 between the target tracks in a cross-track direction. In this configuration, the first reader 602 is positioned over the corresponding target track 609 and the second reader 604 is positioned over a track adjacent to its corresponding target track 610. Configured in this manner, the ARMR system 650 will only be able to retrieve information from one of the target tracks (target track 609). Thus, a change in mode of operation of the ARMR system, from MIMO (2×) to MISO (1×), in addition to offsetting a location of the reader assembly 606 relative to its zero-skew position, may be required depending on the skew and/or reader separation. It is to be appreciated that although the second reader 604 will not be positioned so as to read information from its corresponding target track 610 during certain non-zero skew scenarios, the signal from the adjacent track read by the second reader may still be helpful in providing a more robust read signal, such as, for example, by cancelling or reducing ITI as in the MISO ARMR system.

Figure 8:
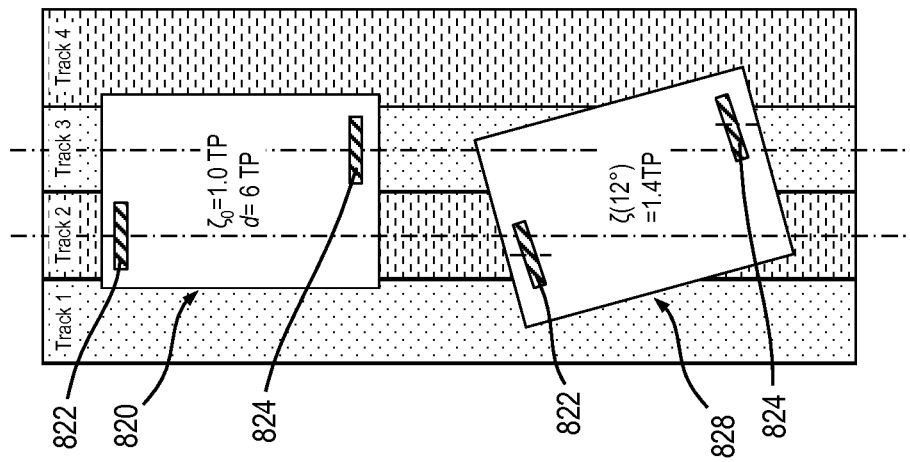
FIGS. 7 and 8 are exemplary scenarios conceptually depicting how reader performance varies with CTS as a function of skew angle θ, in an ARMR system.
Figure 7:
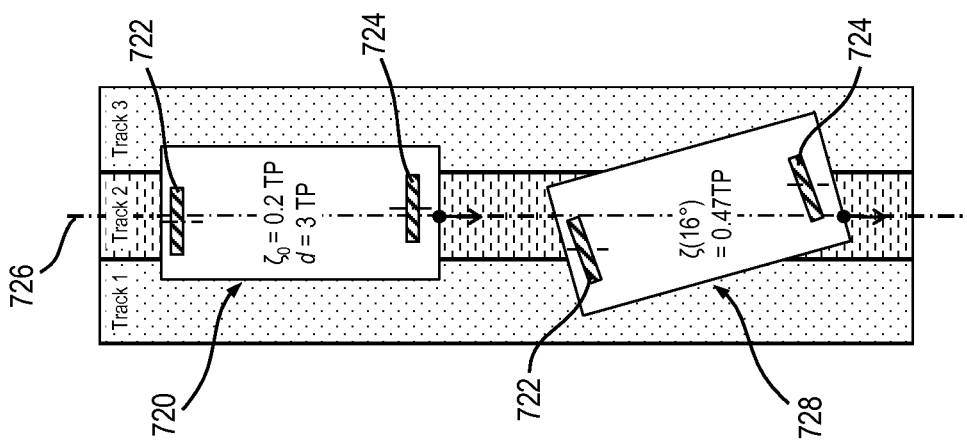

By way of illustration only and without limitation, FIGS. 7 and 8 are exemplary scenarios conceptually depicting how reader performance varies with CTS as a function of skew angle θ, in MISO and MIMO ARMR systems, respectively, according to embodiments of the invention. Specifically, FIG. 7 illustrates an exemplary multi-reader head (i.e., array reader assembly) having a DTS of 3 TP. In a first configuration 720, wherein the multi-reader head exhibits a skew angle of 0 degrees relative to a centerline 726 of a target track (Track 2), the CTS between a first reader (i.e., read head) 722 and a second reader 724 is 0.2 TP. In a second configuration 728 wherein the multi-reader head exhibits a skew angle of 16 degrees, the CTS between the first reader 722 and the second reader 724 is about 0.74 TP.

FIG. 8 conceptually depicts how reader performance for a multi-reader head varies with CTS as a function of skew angle θ in a MIMO ARMR system, according to embodiments of the invention. As previously stated, in a MIMO ARMR system, a multi-reader head is configured to read from multiple tracks. Specifically, in the illustrative MIMO configuration shown in FIG. 8, two readers, 822 and 824, are placed at a CTS of 1.0 TP at zero skew (i.e. θ=0 degrees), which is greater than the $CTS_0$ of 0.2 TP used in the illustrative MISO configuration shown in FIG. 7. In this illustrative embodiment, with a DTS of 3 TP, actual CTS will vary from about 0.72 TP at a skew angle of −16 degrees, to about 1.25 TP at a skew angle of 16 degrees. With a DTS of 6 TP, CTS will vary from about 0.48 TP at a skew angle of −16 degrees, to about 1.52 TP at a skew angle of 16 degrees. With a DTS of 9 TP, CTS will vary from about 0.2 TP at a skew angle of −16 degrees, to about 1.8 TP at a skew angle of 16 degrees. The larger the DTS, the more pronounced the variation in CTS will be as a function of skew angle.

The ability of the multiple-reader head to read multiple tracks in the MIMO ARMR system will depend on an ability to keep the actual CTS between readers to within a prescribed range. A smaller DTS will enable the multiple-reader head to be more tolerable to variations in skew angle; likewise, a larger DTS will render the multiple-reader head more sensitive to variations in skew.

In the exemplary embodiment shown in FIG. 8, a multi-reader head has a DTS of 6 TP. In a first configuration 820, wherein the multi-reader head exhibits a skew angle of 0 degrees relative to a tangent to a target track or tracks to be read (e.g., Tracks 2 and 3), the CTS between a first reader (i.e., read head) 822 and a second reader 824 is 1.0 TP. In a second configuration 828 wherein the multi-reader head exhibits a skew angle of 12 degrees, the CTS between the first reader 822 and the second reader 824 is about 1.4 TP.

In a MIMO ARMR system, each of the readers is ideally positioned over the centerline of a corresponding track to be read. It is assumed that a lower error rate is achieved when the reader is positioned proximate a centerline of the corresponding track being read, and that the error rate increases when the reader moves off the centerline of the corresponding track. For ARMR-MIMO, both readers should be closely located to each corresponding track center to show good performance, and may be better placed slightly off-track towards each other (e.g., CTS approximately 0.9 TP) due to possible ITI cancellation.

As apparent from FIG. 8, in configuration 828, at a skew angle of 12 degrees, each of the first and second readers 822, 824 is positioned slightly off the centerline of its corresponding track being read. This allows the multi-reader head to maintain operation in a MIMO configuration for higher throughput, despite an increase in the error rate for each reader. In certain applications, for example where a lower throughput is acceptable, improved error rate (e.g., bit error rate (BER)) may be achieved by locating the multi-reader head (e.g., towards Track 3 or Track 1 in configuration 828) so that one of the readers is positioned over a centerline of its corresponding track and the other reader is positioned off-track (e.g., over Track 4). This scenario would require reconfiguration of the ARMR system for operation in a MISO mode.

Figure 9:
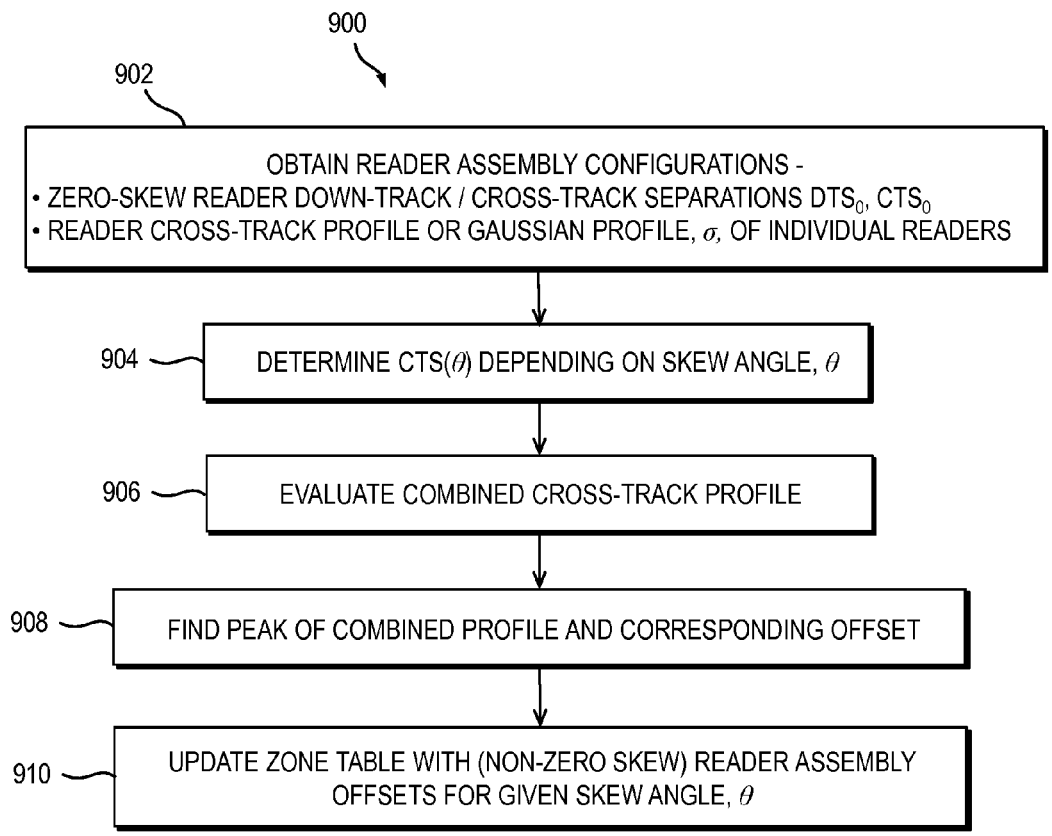
FIG. 9 is a flow diagram depicting at least a portion of an exemplary method for storing reader assembly offsets and corresponding skew angles, according to an embodiment of the invention.

FIG. 9 is a flow diagram depicting at least a portion of an exemplary method 900 for storing reader assembly offsets and corresponding skew angles, according to an embodiment of the invention. At least a portion of the illustrative method 900 shown in FIG. 9 is performed, for example, during a calibration procedure, which may be initiated during a power-on period in the ARMR system, although embodiments of the invention similarly contemplate other times during which the method 900 can be performed. Method 900 obtains reader assembly configurations in step 902, which includes obtaining zero-skew cross-track and down-track separations (i.e., $CTS_0$ and $DTS_0$, respectively) between readers. Step 902 further includes obtaining reader cross-track profiles or Gaussian profiles, $\sigma$, of the individual readers. In one or more embodiments, Gaussian cross-track profile models for each of the readers are used. In alternative embodiments, cross-track profiles of the readers are measured or they may be estimated.

In step 904, CTS between the readers is determined for a given skew angle $\theta$ (i.e., $CTS(\theta)$). Cross-track profiles corresponding to the readers are combined and evaluated in step 906 for the given skew angle. In step 908, a peak amplitude of the combined cross-track profiles is determined along with its corresponding offset. The combined cross-track profiles can be obtained, for example, by summing the cross-track profiles of the readers. In one or more alternative embodiments, the combined cross-track profiles can be measured from ARMR equalizer inputs. A non-zero skew reader assembly offset for the given skew angle $\theta$ is stored, such as in a zone table or alternative storage element, in step 910. Steps 904 through 910 are repeated for a plurality of skew angles, so that the zone table stores a correspondence between reader assembly offset and skew angle for each of the plurality of skew angles. The term "reader assembly offset" is intended to broadly refer to a distance of the reader assembly relative to at least one target track of a magnetic storage medium to be read which, in accordance with one or more embodiments, is calculated as a cross-track center of the readers (in the reader assembly) minus a cross-track center of the target track.

Figure 10:
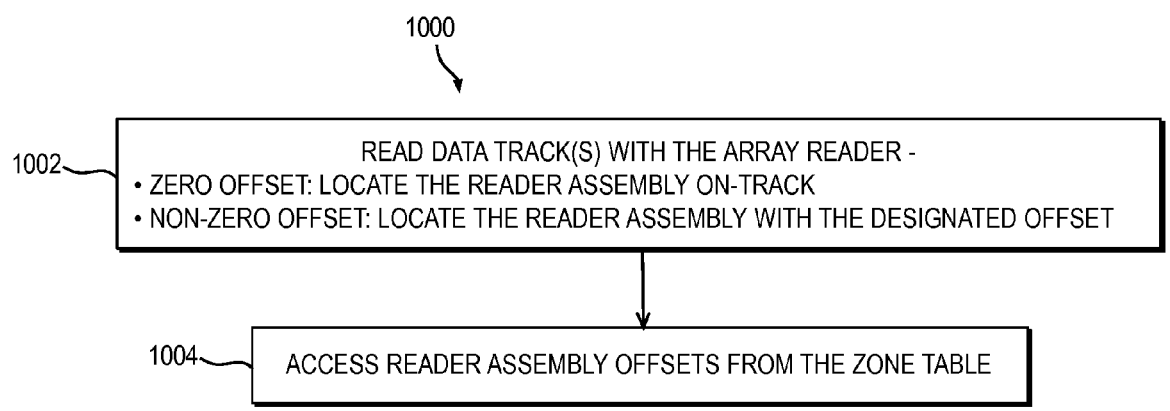
FIG. 10 is a flow diagram depicting at least a portion of an exemplary method for performing skew-dependent reading of at least one track on a magnetic storage medium, according to an embodiment of the invention.

FIG. 10 is a flow diagram depicting at least a portion of an exemplary method 1000 for performing skew-dependent reading of at least one track on a magnetic storage medium, according to an embodiment of the invention. In one or more embodiments, the method 1000 is performed on-the-fly to control a position of the reader assembly in relation to a target track being read. With reference to FIG. 10, in step 1002 the method 1000 performs a read operation of data tracks with the array reader. The reader assembly is positioned in relation to a target track of the magnetic storage medium based on the skew angle. According to an embodiment of the invention, for a zero offset scenario, the reader assembly is located on-track (i.e., the reader assembly offset is aligned with the cross-track center of the target track; for a non-zero offset scenario, the reader assembly is located according to the designated offset accessed from the zone table in step 1004.

As previously stated, although embodiments of the invention have been described herein in the context of an ARMR system including two readers, it is to be appreciated that the illustrative methods shown in FIGS. 9 and 10 may be extended to an ARMR system including more than two readers. For example, in an illustrative ARMR system embodiment including a reader assembly having three readers, zero-skew cross-track and down-track separations (i.e., $CTS_0$ and $DTS_0$, respectively) between the readers are obtained (e.g., $CTS_0$ and $DTS_0$ between the first and second readers, first and third readers, and second and third readers). Reader cross-track profiles or Gaussian profiles, $\sigma$, of the individual readers are obtained, for example using Gaussian cross-track profile models for each of the readers, or using measured or estimated cross-track profiles of the readers. CTS between the three readers is determined for a given skew angle $\theta$. Cross-track profiles corresponding to the three readers are then combined and evaluated for the given skew angle. As in the two-reader scenario, a peak amplitude of the combined cross-track profiles is determined along with its corresponding offset. A non-zero skew reader assembly offset corresponding to the given skew angle $\theta$ is stored, such as in a zone table or alternative storage element. The reader assembly is then positioned as a function of the stored reader assembly offset for the given skew angle. The location of the reader assembly may vary depending on whether the ARMR system is operating in a MISO or MIMO mode.

Figure 11:
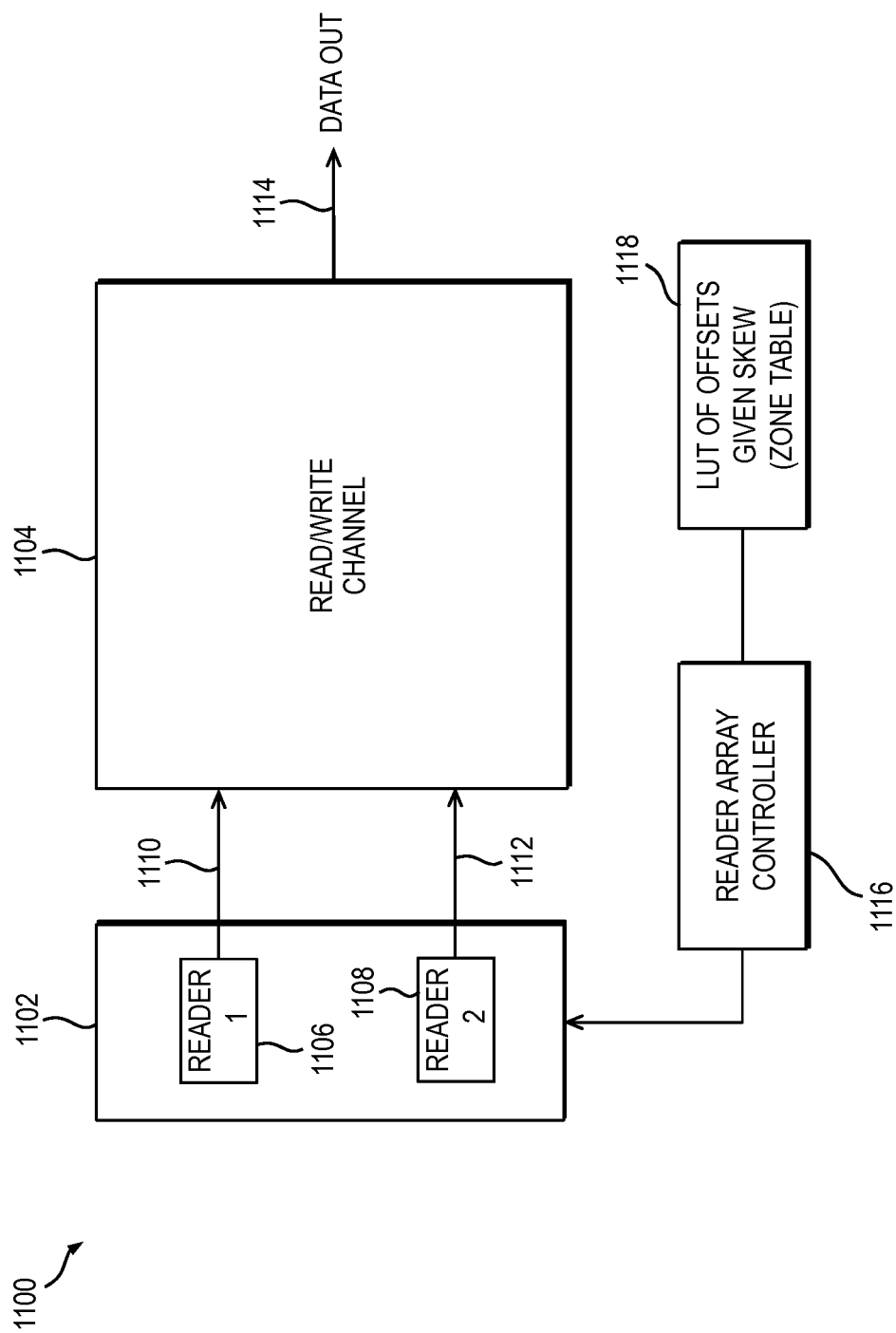
FIG. 11 is a block diagram depicting at least a portion of an exemplary multi-reader ARMR system, according to an embodiment of the invention.

FIG. 11 is a block diagram depicting at least a portion of an exemplary multi-reader ARMR system 1100, according to an embodiment of the invention. The multi-reader ARMR system 1100 includes a multi-reader array head or reader assembly (i.e., reader array) 1102 and a read/write channel 1104 coupled with the reader assembly. In this illustrative embodiment, the reader assembly 1102 includes first and second readers, 1106 and 1108, respectively, although it is to be understood that embodiments of the invention are not limited to two readers. The first and second readers 1106 and 1108 are operative to generate corresponding first and second analog read signals, 1110 and 1112, respectively, indicative of data stored on the magnetic storage medium. The read signals 1110 and 1112 are supplied to the read/write channel 1104 which is operative to further process the read signals and to retrieve therefrom the data stored on the storage medium in the form of a data output signal 1114. The read/write channel 1104, in one or more embodiments, includes processing circuitry, such as, for example, preamplifiers, filters, analog-to-digital converters (ADCs), equalizers, etc., at least a subset of which is used to process the analog read signals 1110 and 1112 in generating the data output signal 1114. Although shown as one functional block, the read/write channel 1104, in one or more embodiments, is actually comprised of two separate channels; namely, a read channel and a write channel (not explicitly shown, but implied).

The ARMR system 1100 further includes a reader array controller 1116 and a look-up table (LUT) 1118, or an alternative storage element, operatively coupled with the reader array controller. As previously described, in one or more embodiments of the invention, reader assembly offsets are computed or estimated as a function of certain criteria relating to the reader assembly 1102, such as, for example, zero-skew CTS and DTS (i.e., $CTS_0$ and $DTS_0$), reader Gaussian profile σ or cross-track profile, etc., as a function of skew angle. The LUT 1118 is adapted to store a plurality of reader assembly offsets and corresponding skew angles for use by the reader array controller 1116 in determining a more optimal location of the reader assembly 1102 given a particular skew angle, as thus zone, associated with the portion of the magnetic storage medium being read. Accordingly, the LUT 1118 may be referred to as a zone table. The illustrative method 900 shown in FIG. 9 is just one means for determining reader assembly offsets stored in the LUT 1118, in accordance with an embodiment of the invention.

As will be appreciated by one skilled in the art, embodiments of the present invention may be implemented as an apparatus, system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to as a "circuit," "module" or "system." Furthermore, embodiments of the present invention may take the form of a computer program product embodied in one or more non-transitory machine-readable medium(s) having machine-readable program code embodied thereon.

One or more embodiments of the invention, or elements thereof, can be implemented in the form of an apparatus including a memory and at least one processor coupled with the memory and operative to perform exemplary method steps.

Figure 12:
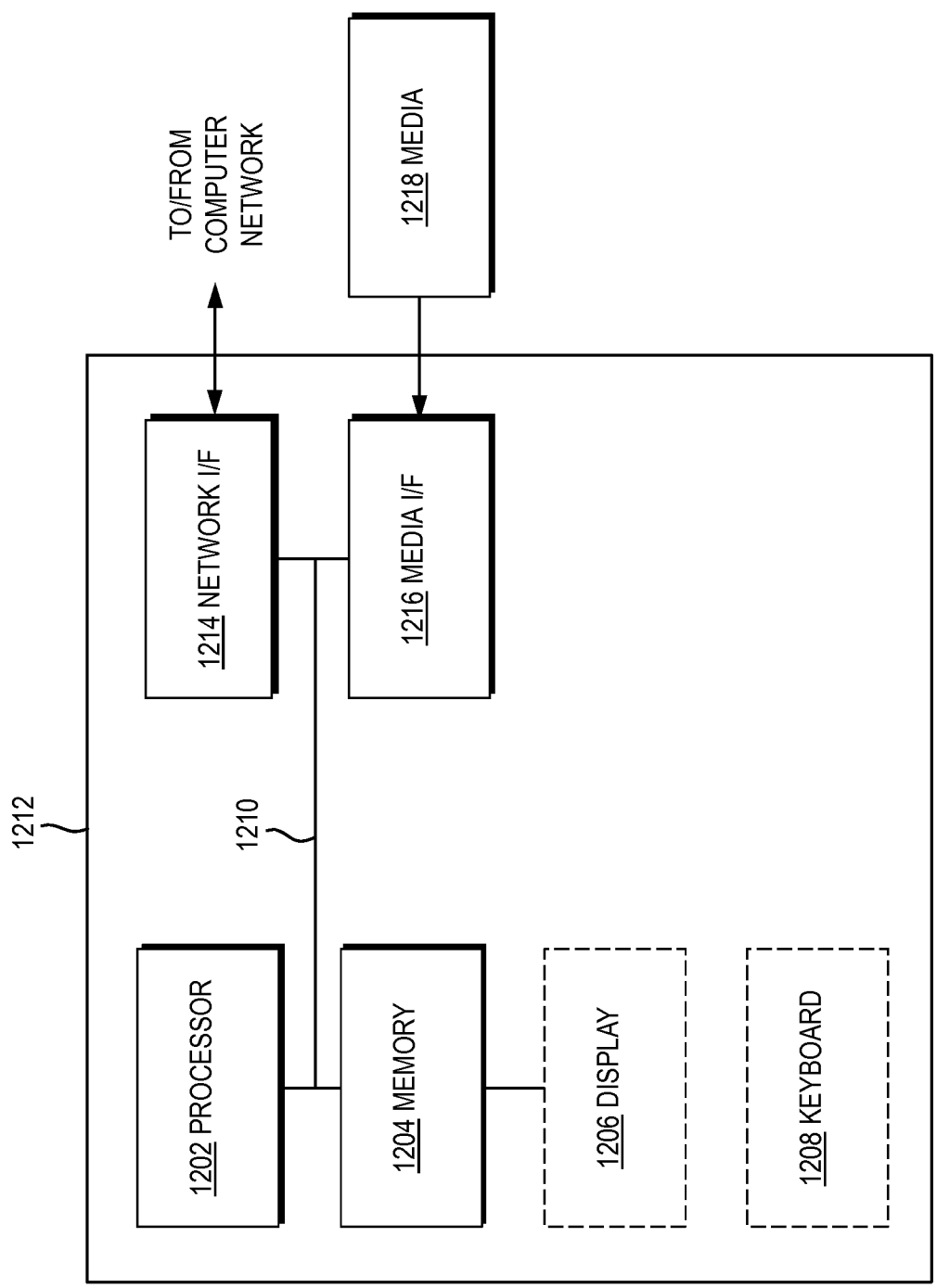
FIG. 12 depicts a computer system that may be useful in implementing one or more embodiments and/or elements of the invention.

One or more embodiments can make use of software running on a general purpose computer or workstation. With reference to FIG. 12, such an implementation might employ, for example, a processor 1202, a memory 1204, and an input/output interface formed, for example, by a display 1206 and a keyboard 1208. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 1202, memory 1204, and input/output interface such as display 1206 and keyboard 1208 can be interconnected, for example, via bus 1210 as part of a data processing unit 1212. Suitable interconnections, for example via bus 1210, can also be provided to a network interface 1214, such as a network card, which can be provided to interface with a computer network, and to a media interface 1216, such as a diskette or CD-ROM drive, which can be provided to interface with media 1218.

Accordingly, computer software including instructions or code for performing methodologies according to embodiments of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 1202 coupled directly or indirectly with memory elements 1204 through a system bus 1210. The memory elements can include local memory employed during actual implementation of the program code, bulk storage, cache memories and embedded memory which provide temporary storage of at least a portion of program code in order to reduce the number of times the code must be retrieved from bulk storage during implementation.

Input/output or I/O devices (including but not limited to keyboards 1208, displays 1206, pointing devices, and the like) can be coupled to the system either directly (such as via bus 1210) or through intervening I/O controllers (omitted for clarity).

Network adapters such as network interface 1214 are also coupled with the system, in one or more embodiments of the invention, to enable the data processing system to become coupled with other data processing systems or remote printers or storage devices through intervening private or public networks. Modems, cable modem and Ethernet cards are just a few of the currently available types of network adapters.

As noted, embodiments of the present invention may take the form of a computer program product embodied in one or more non-transient machine- or computer-readable medium(s) having computer-readable program code embodied thereon. Any combination of one or more computer-readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 1218 is a non-limiting example. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In one or more embodiments, a computer-readable storage medium is any tangible medium that can contain or store a program for use by or in connection with an instruction execution system, apparatus, or device.

Computer program code for carrying out operations according to one or more embodiments of the invention are written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program code, in one or more embodiments, is loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing functions/acts specified in the flowchart and/or block diagram block or blocks.

The block diagrams in the figures depict illustrative architectures, functionality, and operation of implementations of systems, methods and computer program products according to embodiments of the present invention. In this regard, each block shown in the block diagrams may represent a module, segment, or portion of code, which comprises one or more executable instructions for implementing specified functions. It should also be noted that, in one or more embodiments, functions represented by the blocks may occur out of the order noted in the figures. For example, two blocks shown in succession may, in fact, be executed substantially concurrently, or the blocks may sometimes be executed in the reverse order, depending upon the functionality involved. It will also be appreciated that each block of the block diagrams, and combinations of blocks in the block diagrams, can be implemented by special purpose hardware-based systems that perform the specified functions or acts, or combinations of special purpose hardware and computer instructions.

It should be understood that any of the methods described herein can include an additional step of providing a system comprising distinct software modules embodied on a non-transient computer-readable storage medium; the modules include, in one or more embodiments, any or all of the elements depicted in the block diagrams and/or described herein; by way of example and not limitation, a fractional delay filtering module and a correlation module. The method steps can then be carried out using the distinct software modules and/or sub-modules of the system, executing on one or more hardware processors 1202. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICs), functional circuitry, one or more appropriately programmed general purpose digital computers with associated memory, and the like. Given the teachings of the invention provided herein, one of ordinary skill in the related art will be able to contemplate other implementations of the components of the invention.

In an integrated circuit implementation of one or more embodiments of the invention, multiple identical die are typically fabricated in a repeated pattern on a surface of a semiconductor wafer. Each such die may include a device described herein, and may include other structures and/or circuits. The individual dies are cut or diced from the wafer, then packaged as integrated circuits. One skilled in the art would know how to dice wafers and package die to produce integrated circuits. Any of the exemplary circuits illustrated in the accompanying figures, or portions thereof, may be part of an integrated circuit. Integrated circuits so manufactured are considered part of this invention.

Figure 13:
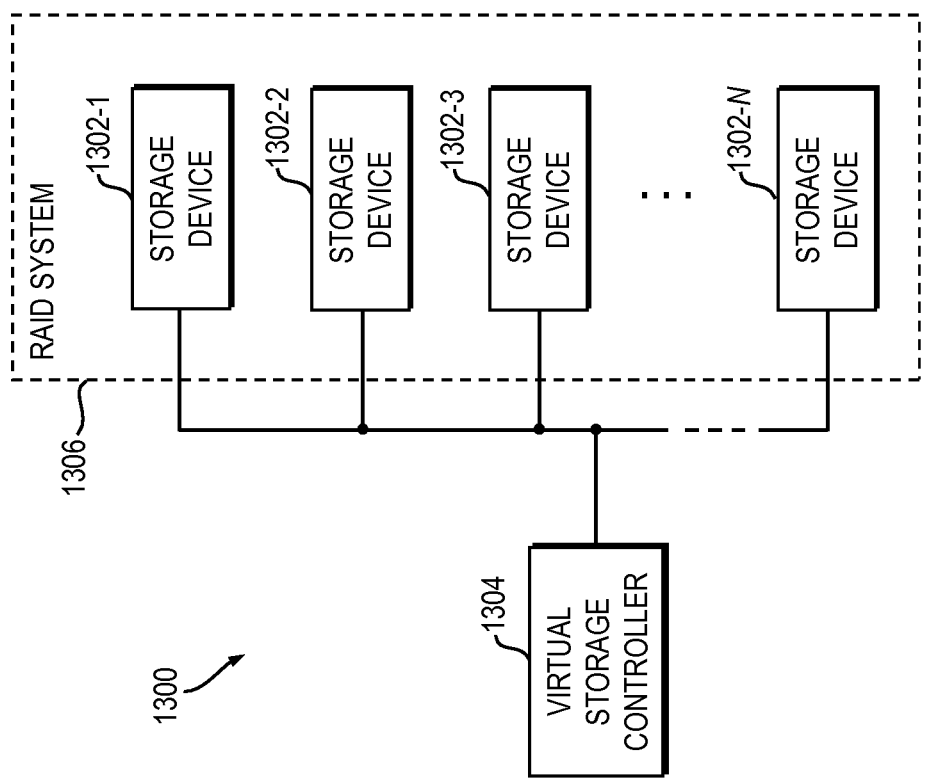
FIG. 13 is a block diagram depicting at least a portion of an exemplary virtual storage system comprising multiple storage devices, at least one of the storage devices incorporating techniques for mitigating the impact of skew in an ARMR environment, according to an embodiment of the invention.

Embodiments of the invention are suitable for use in conjunction with a virtual storage system 1300 comprising multiple storage devices 1302-1 through 1302-N, possibly of multiple different types, as illustrated in FIG. 13. For example, the storage devices 1302-1 through 1302-N may be implemented using all hard disk drives (HDDs), all solid-state drives (SSDs), or using a combination of one or more HDDs and one or more SSDs. Other storage device types are similarly contemplated. The virtual storage system 1300, also referred to as a storage virtualization system, illustratively comprises a virtual storage controller 1304 coupled with a redundant array of independent devices (RAID) system 1306. As will be known by those skilled in the art, RAID is a storage technology that provides increased reliability, among other features, through redundancy. This is accomplished by combining multiple physical storage components (e.g., HDDs, SSDs, etc.) into a logical (i.e., virtual) unit, where data is distributed across the multiple storage components in one of a plurality of ways, generally referred to as "RAID levels." The RAID system 1306 more specifically comprises N distinct storage devices denoted 1302-1, 1302-2, . . . 1302-N, where N is an integer greater than one. As previously stated, all storage devices 1302-1 through 1302-N need not be of the same type. Furthermore, one or more of the storage devices 1302-1 through 1302-N of the RAID system 1306 are assumed to be configured to include apparatus and/or circuitry as disclosed herein. These and other virtual storage systems comprising multiple storage devices (e.g., HDDs, SSDs, or some combination of HDDs and SSDs), are considered embodiments of the invention.

The illustrations of embodiments of the invention described herein are intended to provide a general understanding of the structure of various embodiments, and they are not intended to serve as a complete description of all the elements and features of apparatus and systems that might make use of the structures described herein. Many other embodiments will become apparent to those skilled in the art given the teachings herein; other embodiments are utilized and derived therefrom, such that structural and logical substitutions and changes can be made without departing from the scope of this disclosure. The drawings are also merely representational and are not drawn to scale. Accordingly, the specification and drawings are to be regarded in an illustrative rather than a restrictive sense.

Embodiments of the invention are referred to herein, individually and/or collectively, by the term "embodiment" merely for convenience and without intending to limit the scope of this application to any single embodiment or inventive concept if more than one is, in fact, shown. Thus, although specific embodiments have been illustrated and described herein, it should be understood that an arrangement achieving the same purpose can be substituted for the specific embodiment(s) shown; that is, this disclosure is intended to cover any and all adaptations or variations of various embodiments. Combinations of the above embodiments, and other embodiments not specifically described herein, will become apparent to those of skill in the art given the teachings herein.

The abstract is provided to comply with 37 C.F.R. §1.72(b), which requires an abstract that will allow the reader to quickly ascertain the nature of the technical disclosure. It is submitted with the understanding that it will not be used to interpret or limit the scope or meaning of the claims. In addition, in the foregoing Written Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the appended claims reflect, inventive subject matter lies in less than all features of a single embodiment. Thus the following claims are hereby incorporated into the Written Description, with each claim standing on its own as separately claimed subject matter.

Given the teachings of embodiments of the invention provided herein, one of ordinary skill in the art will be able to contemplate other implementations and applications of the techniques of embodiments of the invention. Although illustrative embodiments of the invention have been described herein with reference to the accompanying drawings, it is to be understood that embodiments of the invention are not limited to those precise embodiments, and that various other changes and modifications are made therein by one skilled in the art without departing from the scope of the appended claims.

What is claimed is:

1. A method for enhancing read performance in a multi-reader array reader magnetic recording (ARMR) system, the method comprising:
    obtaining a first reader offset profile corresponding to a first reader of a multi-reader array head in the ARMR system;
    obtaining at least a second reader offset profile corresponding to at least a second reader of the multi-reader array head in the ARMR system;
    combining the first and second reader offset profiles to generate a combined reader offset profile; and
    controlling a location of the multi-reader array head in the ARMR system relative to at least one target track associated with a magnetic storage medium to be read as a function of a peak amplitude of the combined reader offset profile.

2. The method of claim 1, further comprising determining a location of the multi-reader array head as a function of a zero-skew cross-track separation between the first and second readers, a zero-skew down-track separation between the first and second readers, and a skew angle between the multi-reader array head, to which the first and second readers are attached, and a tangent to the at least one target track to be read.

3. The method of claim 1, further comprising measuring a cross-track profile corresponding to each of the first and second readers as a function of a skew angle between the multi-reader array head, to which the first and second readers are attached, and a tangent to the at least one target track to be read to thereby generate the combined reader offset profile.

4. The method of claim 3, wherein measuring the cross-track profile corresponding to each of the first and second readers is conducted during a calibration procedure of the reader assembly.

5. The method of claim 1, wherein obtaining at least one of the first and second reader offset profiles comprises determining a Gaussian cross-track profile model for at least a corresponding one of the first and second readers.

6. The method of claim 1, further comprising storing pre-computed designated read offsets corresponding to each of at least a subset of the readers as a function of skew angle.

7. The method of claim 6, further comprising, while reading data with the multi-reader array head, applying the pre-computed designated read offsets as a function of a zone of the magnetic storage medium being read.

8. The method of claim 6, further comprising storing the pre-computed designated read offsets in a zone table, the zone table providing a correspondence between reader assembly offset and skew angle for each of a plurality of skew angles.

9. The method of claim 1, wherein combining the first and second reader offset profiles to generate the combined reader offset profile comprises summing the first and second reader offset profiles.

10. The method of claim 1, wherein controlling a location of the multi-reader array head for a given skew angle comprises subtracting a cross-track center of the at least one target track from a cross-track center of the first and second readers of the multi-reader array head for a given skew angle.

11. The method of claim 1, wherein controlling the location of the multi-reader array head is performed on-the-fly while reading data from the at least one target track associated with a magnetic storage medium.

12. The method of claim 1, further comprising obtaining at least a third reader offset profile corresponding to at least a third reader of the multi-reader array head in the ARMR system, wherein the step of combining comprises combining the first, second and at least third reader offset profiles to generate the combined reader offset profile.

13. A multi-reader two-dimensional magnetic recording (ARMR) system having enhanced read performance, comprising:
    memory; and
    at least one control module coupled with the memory and configured: (i) to obtain a first reader offset profile corresponding to a first reader of a multi-reader array head in the ARMR system; (ii) to obtain at least a second reader offset profile corresponding to at least a second reader of the multi-reader array head in the ARMR system; (iii) to combine the first and second reader offset profiles to generate a combined reader offset profile; and (iv) to control a location of the multi-reader array head in the ARMR system relative to at least one target track associated with a magnetic storage medium to be read as a function of a peak amplitude of the combined reader offset profile.

14. The system of claim 13, wherein the control module is further configured to determine a location of the multi-reader array head as a function of a zero-skew cross-track separation between the first and second readers, a zero-skew down-track separation between the first and second readers, and a skew angle between the multi-reader array head, to which the first and second readers are attached, and a tangent to the at least one target track to be read.

15. The system of claim 13, wherein the control module is further configured to measure a cross-track profile corresponding to each of the first and second readers as a function of a skew angle between the multi-reader array head, to which the first and second readers are attached, and a tangent to the at least one target track to be read to thereby generate the combined reader offset profile.

16. The system of claim 13, wherein the control module is further configured to store pre-computed designated read offsets corresponding to each of at least a subset of the readers as a function of skew angle.

17. The system of claim 13, wherein the first and second reader offset profiles are combined by the control module to generate the combined reader offset profile by summing the first and second reader offset profiles.

18. The system of claim 13, wherein the control module is configured to control the location of the multi-reader array head for a given skew angle by subtracting a cross-track center of the at least one target track from a cross-track center of the first and second readers of the multi-reader array head for a given skew angle.

19. The system of claim 13, wherein the control module is further configured to obtain at least a third reader offset profile corresponding to at least a third reader of the multi-reader array head in the ARMR system, wherein the step of combining comprises combining the first, second and at least third reader offset profiles to generate the combined reader offset profile.

20. The system of claim 13, wherein the control module is configured to store, in the memory, pre-computed designated read offsets corresponding to each of at least a subset of the readers as a function of skew angle.

21. The system of claim 13, wherein at least a portion of the control module is fabricated in at least one integrated circuit.

22. A data storage system, comprising:
a plurality of storage devices, wherein at least one of the plurality of storage devices comprises:
a multi-reader array head including at least first and second readers; and
a control module coupled with the multi-reader array head and configured: (i) to obtain a first reader offset profile corresponding to the first reader of the multi-reader array head; (ii) to obtain at least a second reader offset profile corresponding to the second reader of the multi-reader array head; (iii) to combine the first and second reader offset profiles to generate a combined reader offset profile; and (iv) to control a location of the multi-reader array head in the at least one of the plurality of storage devices relative to at least one target track associated with a magnetic storage medium to be read as a function of a peak amplitude of the combined reader offset profile.

23. The data storage system of claim 22, wherein the at least one of the plurality of storage devices is configured as a device in a redundant array of independent devices (RAID) system.

* * * * *